H. C. BAXTER.
APPARATUS FOR COOKING CORN AND OTHER FOOD PRODUCTS.
APPLICATION FILED FEB. 21, 1907.
959,448.
Patented May 31, 1910.
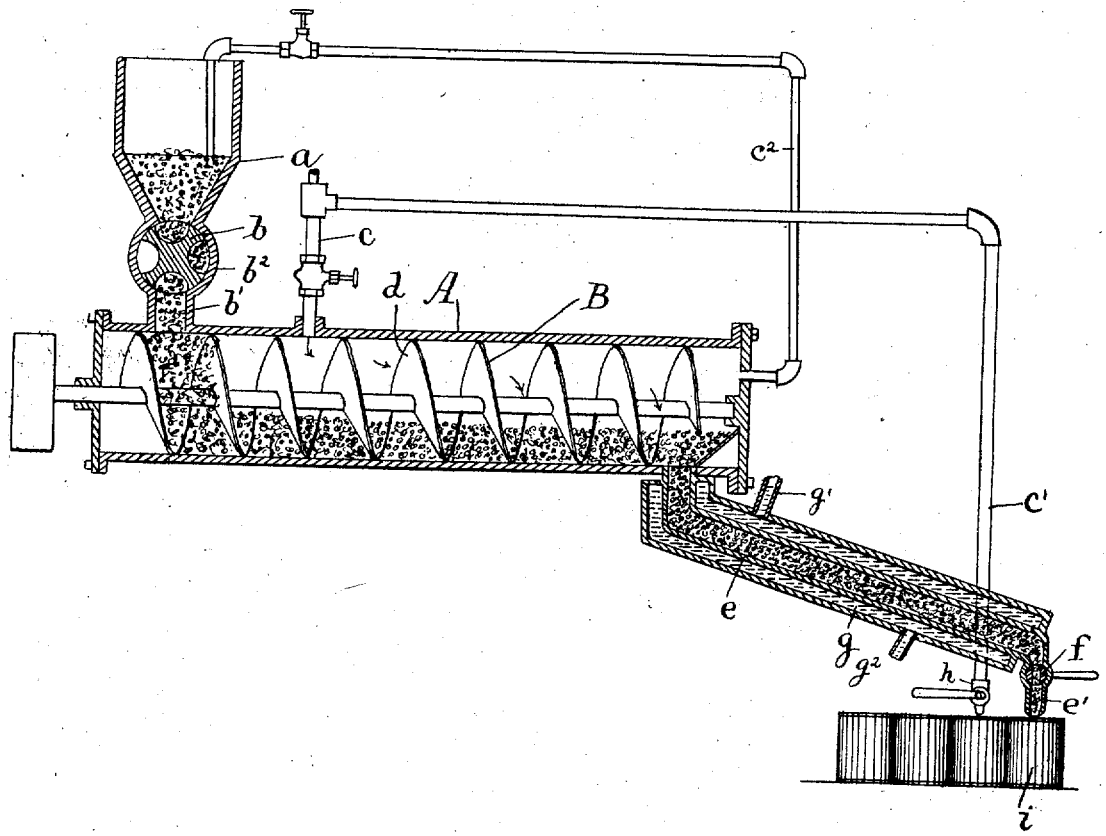

UNITED STATES PATENT OFFICE.

HARTLEY C. BAXTER, OF BRUNSWICK, MAINE.

APPARATUS FOR COOKING CORN AND OTHER FOOD PRODUCTS.

959,448.   Specification of Letters Patent.   Patented May 31, 1910.

Application filed February 21, 1907. Serial No. 358,621.

*To all whom it may concern:*

Be it known that I, HARTLEY C. BAXTER, a citizen of the United States of America, and resident of Brunswick, county of Cumberland, State of Maine, have invented certain new and useful Improvements in Apparatus for Cooking Corn and other Food Products, of which the following is a specification.

My invention relates particularly to an apparatus for canning corn, but it is also adapted to canning other food products of a similar nature such as soups, pumpkin, potted meats or any food products which are liquid or semi-liquid in consistency or which are in a finely divided condition.

In the canning of corn as now commonly practiced, the corn is first cut from the ear, screened to remove the silk and particles of cob, mixed with a proportion of water to reduce the consistency of the mass and then passed through a so called "cooker", which is a drum containing an agitator by which the corn is stirred and fed from the inlet to the outlet where it is discharged through a filling nozzle into the cans. The agitator is made hollow and steam is passed through it and discharged into the mass of corn as it is fed through. The steam discharging into the mass of cold corn and in a drum which is not steam tight but which is provided with an open hopper, is immediately condensed so that the temperature of the corn is not raised above 180 or 190 degrees, and cannot possibly be raised above the boiling point (212 degrees). Corn cannot be sufficiently cooked by the above apparatus so that the germs of fermentation will be killed. Because of the fact that the germs in corn and some other vegetables cannot be destroyed at or below the boiling point within a reasonable time, the heating as above described is always preliminary to a subsequent sterilizing treatment by which the cans after being filled and sealed are subjected to a degree of heat considerably higher than the boiling point. In this manner the entire contents of the can are sterilized and without this subsequent heating of the cans the corn would soon spoil.

In the operation of sterilizing or "retorting" the cans after being filled and sealed are placed in trays and stacked in a steam tight retort after which steam under pressure is admitted for about one hour and the cans are then removed and cooled. The pressure of the steam is sufficient to produce a temperature of 250 degrees this high temperature being necessary to kill the germs found in the corn. During the sterilizing operation the heat penetrates slowly to the interior of the body of corn and the outer layers become overheated and often become dry and hard and by reason of this liability to overheat it has always been necessary to add considerable quantities of water to the corn and to reduce it to the consistency of a semiliquid mass.

The process as above described requires comparatively long time and the quality of the resulting product is inferior for the reasons above stated.

According to my invention, I use an apparatus of the general type as that described except that I connect the cooling chamber with the outlet of the sterilizing chamber by means of an open passage through which the corn is forced by the steam pressure in the sterilizing chamber. This construction allows me to keep the cooling chamber filled at all times independently of the use of any pump with a body of corn always interposed between the cooling chamber and the outlet of the sterilizing chamber. In this way the live steam is excluded from the cooling chamber and does not come in contact with its cold walls except as it may be carried in the body of the corn as the latter passes slowly through. I thus greatly simplify the construction of the apparatus, do away with certain working parts and utilize the steam pressure within the sterilizing chamber to carry the corn in a solid and continuous stream to the outlet nozzle.

I illustrate my invention by means of the accompanying drawing in which is shown a longitudinal section of an apparatus constructed according to my invention.

The corn is sterilized by passing it through a steam tight sterilizing chamber charged with steam under a pressure sufficient to kill the germs in the corn. As here shown, I make use of an elongated cylinder A horizontally disposed and containing a screw conveyer B adapted to agitate the corn and to separate the particles, moving them in a continuous stream from the inlet to the outlet.

The corn is fed in at the inlet and through a suitable trap which does not allow the escape of the internal steam pressure in the cylinder. As here shown I provide a hopper *a* for receiving the corn, and a revolving valve *b* held in a suitable casing $b^2$ connecting with the inlet duct $b'$. The valve *b* is provided with a plurality of pockets which receive the corn from the outlet of the hopper and discharge it into the duct $b'$ whence it passes into the cylinder without allowing the escape of any steam. A steam pipe *c* is provided for introducing steam under a pressure (preferably about 15 lbs.) into the cylinder and a return steam pipe $c^2$ leads from the end of the cylinder to the hopper through which a small quantity of steam may be allowed to escape to create a steam circulation.

Means are provided for cooling the corn below the boiling point before introducing it into the cans, to prevent ebullition in the cans. For this purpose I provide a cooling chamber *e* at the outlet end of the cylinder, surrounded by a water jacket *g*, having a water inlet $g'$ and water outlet $g^2$. This cooling chamber is shown as an inclined pipe of considerable length having a filling nozzle $e'$ at its lower end and a valve *f* for controlling the discharge of corn from the nozzle.

The sterilized cans *i* are fed under the nozzle in any suitable manner and suitable means are provided for maintaining sterilizing atmosphere about the filling nozzle and for sterilizing the cans themselves before they come to the nozzle. This may be done by filling them with superheated steam by means of a suitable valve controlled nozzle *h* connecting with the steam pipe $c'$, as they come up to the filling nozzle.

The corn is fed into the sterilizing chamber in such a quantity that the chamber will be only partially filled, the conveyer carrying it in a comparatively small stream through the chamber. The kernels of corn are thus thoroughly stirred and allowed to come in contact with the sterilizing medium and thus to become completely sterilized. As the corn reaches the outlet it drops down into the cooling chamber gradually filling it completely full and forming a solid mass of corn between the outlet of the sterilizing chamber and the interior of the cooling chamber. This mass of material holds back the steam from entering the cooling chamber and coming in contact with its cooled surfaces except so far as the steam is entrapped in the body of corn as it moves along. The steam within the sterilizing chamber acting on the interposed mass of material at the entrance of the sterilizing chamber also creates a pressure on the corn tending to force it through the cooling chamber and out at the filling nozzle. Thus the same internal pressure is maintained throughout the entire apparatus from the inlet to the filling nozzle. In operating the apparatus care is taken not to draw off the corn at the filling nozzle any faster than it is fed in at the inlet so that there will always be maintained a mass of corn at the inlet of the cooling chamber and the live steam will be excluded from contact with the cooled interior walls of the cooling chamber. All the juices and flavor of the corn will be retained as the greater bulk of the steam condenses and goes out with the corn, and steam which is allowed to escape in order to insure circulation in the cylinder is put back into the corn in the hopper or elsewhere as hereinbefore described. Corn treated in this manner being thoroughly sterilized, will keep for an indefinite length of time, it requires little or no subsequent cooking, it retains all the natural flavor and the process can be carried out with a great saving of time over the old way of canning. My apparatus will also do away with the use of much of the machinery employed in the usual method of canning corn, peas, and other vegetables, the particles of which are small and in such condition that they can be exposed to the direct action of steam under pressure. Its use will also cause a great saving in labor and produce goods of much better quality. It will be practicable with my apparatus to fill the cans with pure corn, unmixed with water, sugar, or any other substances, as the particles of corn are exposed for a short time only to the extreme heat necessary to sterilize them, and the mass of corn does not have to be thinned down or diluted with water. It will be understood that in using the term "can," I intend to include any suitable receptacle.

It is evident that steam under pressure may be obtained within the sterilizing chamber otherwise than as here shown, as for instance, by heating the chamber externally or forcing in heated air and various modifications may be made in the several parts of my apparatus without departing from the spirit of my invention. The cooling chamber for instance may be formed otherwise than as herein shown but it must be of such shape that it will be kept substantially full from the inlet to the outlet.

I claim:—

1. In a machine for preparing green corn and other like food products, the combination of a sterilizing chamber having an inlet and an outlet, and adapted to maintain an internal steam pressure, means for supplying steam under pressure to said sterilizing chamber, a feeding device for introducing corn into the sterilizing chamber against the internal pressure, means for stirring and conveying the corn from the inlet to the outlet, and a steam tight cooling chamber connected with said outlet by an open passage whereby the steam pressure is permitted to aid the passage of the corn through the cooling chamber.

2. In a machine for preparing green corn and other like food products, the combination of a sterilizing chamber having an inlet and an outlet, and adapted to maintain an internal steam pressure, means for supplying steam under pressure to said sterilizing chamber, a feeding device for introducing corn into the sterilizing chamber against the internal pressure, means for stirring and conveying the corn from the inlet to the outlet, a steam tight cooling chamber connected with said outlet by an open passage whereby the steam pressure is permitted to aid the passage of the corn through the cooling chamber and means for controlling the outlet of said cooling chamber.

Signed by me at Portland, Maine, this 18th day of February, 1907.

HARTLEY C. BAXTER.

Witnesses:
S. W. BATES,
ELEANOR W. DENNIS.